United States Patent Office 3,248,126
Patented Apr. 26, 1966

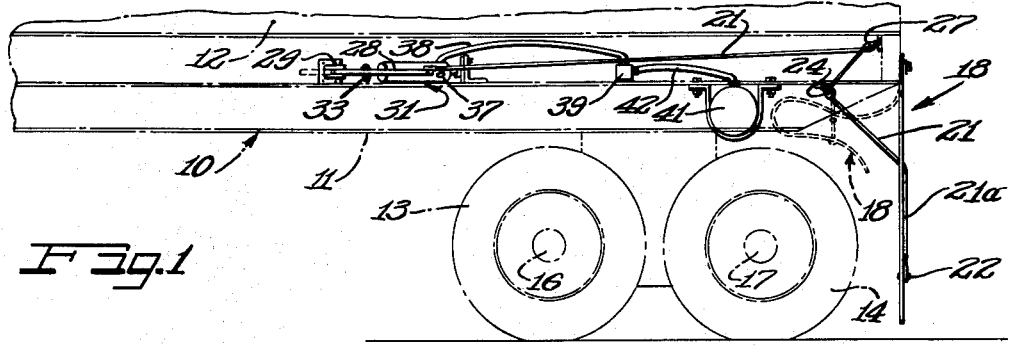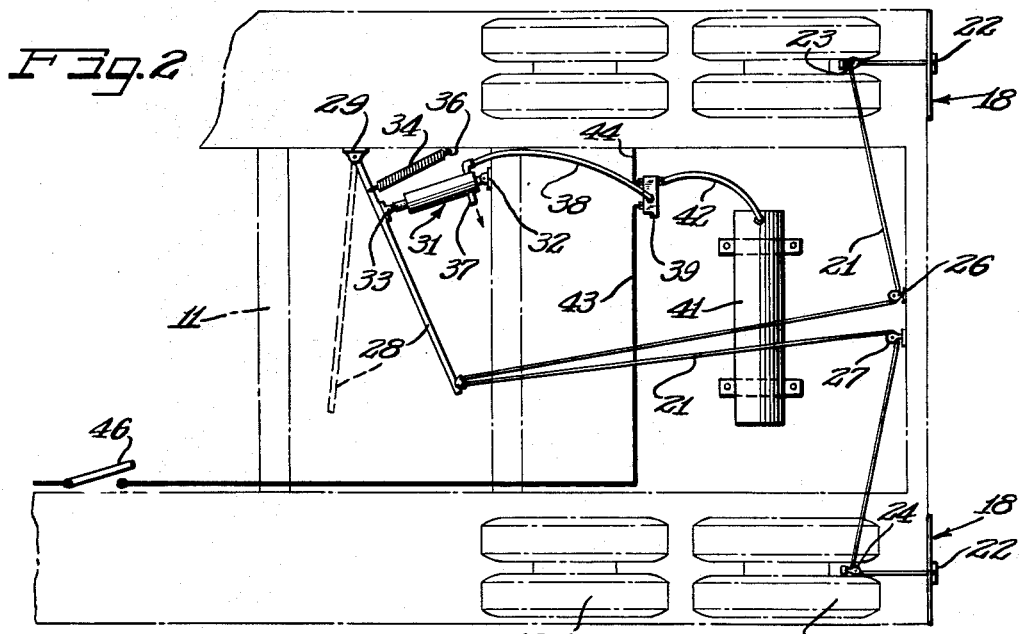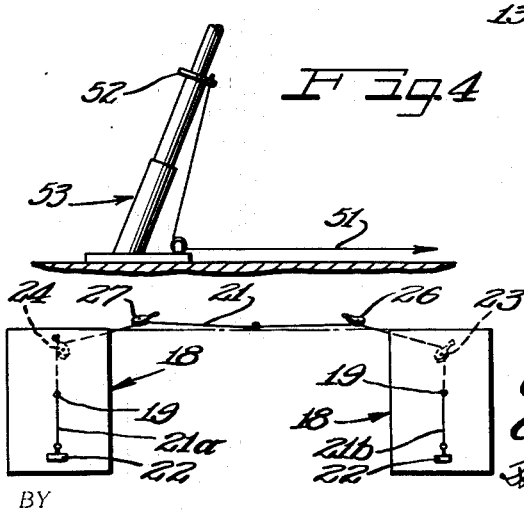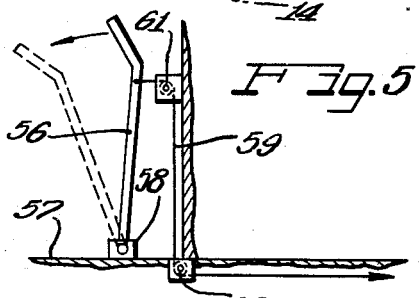

3,248,126
MUD FLAP RETRACTORS
Gene R. Saxton, 31 N. Mason Ave., and Charles L. Morganti, 21 N. Mason Ave., both of Chicago, Ill.
Filed June 1, 1964, Ser. No. 371,724
3 Claims. (Cl. 280—154.5)

The present invention relates to devices for retracting mud flaps from dump truck assemblies, and the like.

Most State regulatory bodies require large trucks to have mud flaps adjacent the rear wheels of the truck. Normally, these mud flaps are composed of hard rubber of substantially inflexible form. When such flaps are applied to a dump truck assembly, however, and the dump box is raised, a part of the load may bury the flap so that when the truck is moved forward, the flaps are torn from their supports.

We are familiar with several attempts to provide retractable mud flaps for dump truck assemblies and the like. By and large, however, these attempts involve the use of cumbersome and expensive equipment which requires a large amount of labor for installation. In accordance with the present invention, we provide an improved type of mud flap which by its very nature permits the use of a less cumbersome, less expensive retracting system to be used on the truck.

An object of the invention is to provide an improved dump truck assembly of the type in which a pair of mud flaps is disposed at the rear of the dump box immediately behind the rear wheels, the flaps being so constructed as to be readily foldable into an out of the way position when desired.

Another object of the invention is to provide an improved mud flap assembly for dump trucks and the like in combination with a pneumatically operated retracting system.

Still another object of the invention is to provide an improved mud flap construction which makes it possible to employ less cumbersome and less expensive retracting mechanisms for use in connection therewith.

Other objects and features of the present invention will become apparent to those skilled in the art from the following detailed description of the attached sheet of drawings which illustrate several embodiments of the invention.

In the drawings:

FIGURE 1 is a fragmentary view in elevation of the mud flap retracting assembly of the present invention, in a preferred embodiment;

FIGURE 2 is a plan view of the mud flaps and their retracting assembly;

FIGURE 3 is a rear view of the mud flap assembly;

FIGURE 4 is a fragmentary view in elevation of a modified form of the invention; and FIGURE 5 is a fragmentary view of another modified form of the invention.

As shown in the drawings:

In FIGURE 1, reference numeral 10 indicates generally a dump truck body including a frame 11 carrying a dump box 12 pivotally mounted with respect to the frame 11, in any suitable manner as will be evident to anyone skilled in the art. The frame 11 is supported on sets of wheels 13 and 14 mounted on their axles 16 and 17, respectively.

The mud flap assemblies themselves are best illustrated in FIGURES 1 and 3 of the drawings. In accordance with the present invention, there is provided a pair of mud flaps 18 composed of a flexible material capable of being folded upon itself. A particularly preferred material for the flaps 18 consists of a cord reinforced live rubber material. This type of material has considerably more flexibility than the conventional hard rubber used for mud flaps, and this added flexibility is used to advantage in the retracting system of the present invention.

As best illustrated in FIGURE 3, each of the mud flaps 18 is provided with a centrally disposed aperture 19 through which the end portions 21a and 21b of a cable 21 extend. The extreme end portions of the cable 21 are anchored to a plate 22 disposed below the aperture 19, but in line therewith. Then, tension upon the cable 21 causes the flap 18 to be retracted upwardly and to fold upon itself in a pleated fashion, as illustrated in dotted outline of the showing of FIGURE 1. The use of the flexible flaps, in combination with the manner of securing the cable through and onto the flaps makes it possible to use this type of installation where there is very little space available behind the rear wheels 14.

The system shown in FIGURES 1 to 3 for retracting the flaps 18 includes a pair of pulleys 23 and 24 secured to the frame 11 substantially in line with the flaps 18, and a pair of pulleys 26 and 27 secured to the frame 11 at spaced points inwardly of the pulleys 23 and 24, and located at substantially the mid-section of the frame 11. The cable 21 (which may be made in several sections, if desired) is secured to an actuating arm 28 which has its opposed end portion pivotally secured to the frame 11 at a pivot 29.

The actuating arm 28 is moved into the flap retracting position shown in dotted outline in FIGURE 2 by means of a pneumatic piston and cylinder assembly indicated at reference numeral 31 in the drawings. One end of the pneumatic assembly 31 is anchored to the frame 11 by means of a pivot 32. The working piston is coupled to the arm 28 by means of a bracket 33. A coiled spring 34 has one end connected to the actuating arm 28 and its opposite end secured to the frame 11 by means of an eye 36, the spring 34 functioning to restore the actuating arm 28 to the position shown in FIGURE 2 when the pneumatic system is deenergized. An exhaust vent 37 is also provided on the pneumatic assembly 31 for venting air therefrom on the return stroke.

The pneumatic assembly 31 is actuated from a line 38 connected to a solenoid operated valve 39 secured to the frame 11. A compressed air cylinder 41, which may be an emergency air tank for the brake assembly of the dump truck supplies compressed air to the valve 39 by means of a line 42. The solenoid operated valve 39 is energized by means of a pair of electrical conductors 43 and 44, the conductor 44 connecting the solenoid to ground potential at the frame 11. The conductor 43 is connected to the opposite side of the line and includes a switch 46, preferably located in the cab of the truck, for completing the electrical circuit to the valve 39.

The operation of the device should be apparent from the previous description. When it is desired to retract the mud flaps 18 for the purpose of unloading the dump box 12, the operator closes the switch 46 thereby completing the electrical circuit to the solenoid operated valve 39. The opening of the valve 39 thereupon communicates the compressed air tank 41 with the pneumatic assembly 31 through the lines 38 and 42. The piston of the pneumatic assembly is then moved relative to the cylinder, causing the actuating arm 28 to be pivoted about the pivot 29 and to assume the position indicated in dotted outline in FIGURE 2. When this happens, the cable 21 is tensioned, and is pulled forwardly of the truck frame along the pulleys 23, 24, 26 and 27. The end portions 21a and 21b of the cable 21 thereupon pull upwardly on the anchoring plate 22 through the aperture 19, and cause the flap 18 to be folded upon itself in pleated fashion, as illustrated in dotted outline in FIGURE 1. In this position, the mud flap is entirely out of the way to permit dumping of the contents of the dump box 12 without interference and without danger of having the flaps 18 torn from their moorings.

A modified form of the invention is illustrated in FIGURE 4 of the drawings. In this form of the invention, the flexible flaps 18 are actuated by connecting the cable 21 to a second cable 51 having its end secured to a collar 52 disposed on one of the telescoping sections of a telescoping column 53 used to raise and lower the dump box 12. This particular form of the invention results in automatic retraction of the mud flaps 18 upon raising of the dump box. The same type of flexible flaps 18 are employed in the assembly, of course, to secure the advantages previously noted.

The system of FIGURE 5 involves the use of a manually retractable arm 56 secured to the floor 57 of the truck by means of a pivot bracket 58. The arm 56 carries a second cable 59 which is trained over a pair of pulleys 61 and 62 and is connected to the actuating cable 21 in the manner illustrated in FIGURE 2.

The mud flap retracting assembly of the present invention is particularly designed for those types of truck bodies which have very limited space behind the rear wheels for the mud flaps. The installation of the assembly does not require substantial changes in the truck frame, as do other types of mud flap retractors. The installation can be made quickly and inexpensively on all styles of truck bodies.

It should be evident that various modifications can be made to the described embodiments without departing from the scope of the present invention.

We claim as our invention:
1. In a dump truck assembly including rear wheels, cable means and a remotely operable actuator connected to the cable means for pulling the same, the improvement which comprises a pair of substantially resilient flaps each having an aperture extending therethrough, said flaps being supported in depending relation behind said rear wheels, the ends of said cable means extending through the respective apertures and being connected to the flaps below said apertures, said flaps being sufficiently flexible so that pulling of said cable means in a generally vertical direction results in folding said flaps into a pleated condition without cracking of the flaps.

2. The dump truck assembly of claim 1 which includes a pneumatically operated actuator for pulling said cable means.

3. The dump truck assembly of claim 1 in which the upper end of each of the flaps is fixedly secured to the frame of said truck and operation of said cable means serves to fold the pleated flaps inwardly of said frame.

References Cited by the Examiner
UNITED STATES PATENTS

| | | | |
|---|---|---|---|
| 2,260,101 | 10/1941 | De Falco | 160—84 |
| 2,653,846 | 9/1953 | Wiley | 280—154.5 X |
| 2,660,453 | 11/1953 | Russell | 280—154.5 |
| 2,683,612 | 7/1954 | Bacino | 280—154.5 |
| 2,721,760 | 10/1955 | Lapham | 298—1 |
| 2,857,200 | 10/1958 | Hoppesch | 298—1 |
| 2,981,553 | 4/1961 | Zerbe | 280—154.5 |
| 3,024,838 | 3/1962 | Egleston | 160—193 |

BENJAMIN HERSH, *Primary Examiner.*